(12) United States Patent
Shiraishi (10) Patent No.: US 9,638,156 B2
(45) Date of Patent: May 2, 2017

(54) SADDLE-RIDE TYPE VEHICLE

(71) Applicant: YAMAHA HATSUDOKI KABUSHIKI KAISHA, Iwata-shi, Shizuoka (JP)

(72) Inventor: Takushiro Shiraishi, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 232 days.

(21) Appl. No.: 14/447,793

(22) Filed: Jul. 31, 2014

(65) Prior Publication Data
US 2015/0101576 A1    Apr. 16, 2015

(30) Foreign Application Priority Data

Oct. 10, 2013    (JP) .................................. 2013-212837

(51) Int. Cl.
| | |
|---|---|
| *F02N 15/00* | (2006.01) |
| *B62J 11/00* | (2006.01) |
| *B62J 37/00* | (2006.01) |
| *B62K 11/04* | (2006.01) |
| *F02B 61/02* | (2006.01) |
| *F02M 37/08* | (2006.01) |
| *F02M 25/08* | (2006.01) |
| *F02M 37/00* | (2006.01) |
| *F02N 11/00* | (2006.01) |

(52) U.S. Cl.
CPC ............ *F02N 15/006* (2013.01); *B62J 11/00* (2013.01); *B62J 37/00* (2013.01); *B62K 11/04* (2013.01); *F02B 61/02* (2013.01); *F02M 25/0854* (2013.01); *F02M 37/08* (2013.01); *F02M 37/007* (2013.01); *F02N 11/00* (2013.01)

(58) Field of Classification Search
CPC ....... F02N 15/006; B62K 11/04; B62K 11/02; F02B 61/02; F02M 25/0854; B62J 37/00
See application file for complete search history.

(56) References Cited

U.S. PATENT DOCUMENTS

| | | | | |
|---|---|---|---|---|
| 3,690,095 | A  | * | 9/1972 | Antonio Ignelzi ..... F02C 3/165 60/39.27 |
| 2004/0129481 | A1 | * | 7/2004 | Stolfus .................... B60K 17/24 180/291 |
| 2007/0098573 | A1 | * | 5/2007 | Ueno .................... F02M 37/103 417/360 |
| 2009/0107442 | A1 | * | 4/2009 | Ma ......................... F02M 39/02 123/179.17 |

(Continued)

FOREIGN PATENT DOCUMENTS

| | | |
|---|---|---|
| EP | 2 332 813 A2 | 6/2011 |
| JP | 2012-206530 A | 10/2012 |

OTHER PUBLICATIONS

Official Communication issued in corresponding European Patent Application No. 14170248.0, mailed on Sep. 4, 2014.

*Primary Examiner* — Hung Q Nguyen
*Assistant Examiner* — Xiao Mo
(74) *Attorney, Agent, or Firm* — Keating and Bennett, LLP (57) ABSTRACT

A saddle-ride type vehicle includes a frame, an engine, a starter motor, a predetermined component, and a coupling member. The engine is supported by the frame. The starter motor is attached to the engine. The predetermined component is disposed adjacent to the starter motor. The coupling member couples the predetermined component to the starter motor.

14 Claims, 6 Drawing Sheets

(56) References Cited

U.S. PATENT DOCUMENTS

| | | | | |
|---|---|---|---|---|
| 2010/0078241 A1* | 4/2010 | Maeda | ............ | B62J 37/00 180/68.3 |
| 2010/0243358 A1* | 9/2010 | Suzuki | ............ | B62J 35/00 180/219 |
| 2011/0073399 A1* | 3/2011 | Seki | ............ | B60K 15/03504 180/219 |
| 2011/0135498 A1* | 6/2011 | Gibson | ............ | B60W 10/06 417/15 |
| 2011/0240392 A1* | 10/2011 | Iwata | ............ | B60K 11/04 180/229 |
| 2011/0308874 A1* | 12/2011 | Tanaka | ............ | B60K 15/03504 180/219 |
| 2012/0247433 A1* | 10/2012 | Ozaki | ............ | B62J 37/00 123/519 |
| 2012/0247862 A1* | 10/2012 | Nishimura | ............ | B62K 11/04 180/299 |
| 2013/0082553 A1* | 4/2013 | Shoji | ............ | H02K 11/00 310/71 |

* cited by examiner

SADDLE-RIDE TYPE VEHICLE

BACKGROUND OF THE INVENTION

1. Field of the Invention

The present invention relates to a saddle-ride type vehicle.

2. Description of the Related Art

A large number of components are mounted to a vehicle body of a saddle-ride type vehicle. In many cases, these components are attached to a frame through a stay.

For example, Japan Laid-open Patent Application Publication No. JP-A-2012-206530 describes a structure including a canister disposed over an engine and rearward of an intake device. The canister is attached to a frame through a support stay. The front portion of the support stay is mounted across right and left frame portions. Specifically, the front portion of the support stay is fixed to a pair of mount portions, respectively welded to the right and left frame portions, by pairs of bolts and nuts. On the other hand, the rear portion of the support stay is fixed to a pair of mount portions, welded to a bridge member mounted across the right and left frame portions, by pairs of bolts and nuts.

However, when a component to be disposed close to the engine is fixed to the frame through the stay, the stay inevitably occupies a space between the component and the frame. In this case, a drawback is created in that restrictions are imposed on a tool path leading to engine members attached to the engine (including not only a sensor and members such as fastening bolts of an engine case but also a sheet metal and so forth fixed to the engine case). Especially, a saddle-ride type vehicle is smaller than some types of vehicles such as an automobile, and therefore, the mount space for the aforementioned component is small. Thus, restrictions on the tool path are greatly affected by the stay.

Moreover, when the component is attached to the frame through the stay, the stay inevitably has a large size based on the positions of the component and the frame. For example, in the structure described in Japan Laid-open Patent Application Publication No. JP-A-2012-206530, the support stay is attached to the right and left frame portions and the bridge member. Thus, the support stay is mounted across the right and left frame portions and over to the bridge member, and thus has a large size. Further, when the component is disposed close to the engine, a large distance exists between the component and its attached position on the frame. Accordingly, the stay further inevitably has a large size.

When the stay has a large size as described above, the tool path is inevitably further restricted. Moreover, due to an increase in the size of the stay, additional drawbacks are produced, including an increase in weight of the vehicle and an increase in the number of components used to attach the component.

SUMMARY OF THE INVENTION

Preferred embodiments of the present invention dispose a component close to an engine, easily and reliably produce a tool path, and substantially reduce or prevent an increase in the weight and an increase in the number of components in a saddle-ride type vehicle.

A saddle-ride type vehicle according to a preferred embodiment of the present invention includes a frame, an engine, a starter motor, a predetermined component, and a coupling member. The engine is supported by the frame. The starter motor is attached to the engine. The predetermined component is disposed adjacent to the starter motor. The coupling member couples the predetermined component to the starter motor.

In this case, the predetermined component is coupled to the starter motor through the coupling member. Therefore, the predetermined component is disposed close to the engine. Further, the coupling member is designed to couple the starter motor and the predetermined component, both of which are disposed close to the engine. Therefore, in comparison with the structure in which a stay is mounted between the predetermined component and the frame, the coupling member is prevented from extending into the space surrounding the engine. Thus, a tool path is easily and reliably provided. Further, the coupling member has a smaller size than the stay. Therefore, an increase in the weight and an increase in the number of components are substantially reduced or prevented in the saddle-ride type vehicle.

Preferably, the engine includes a cylinder extending in a direction intersecting with a horizontal direction. Further, the predetermined component is preferably disposed rearward of the cylinder. In this case, the space provided rearward of the cylinder is effectively utilized as the installation space of the predetermined component.

Preferably, the predetermined component does not overlap with the frame in a vehicle side view. In this case, the predetermined component is disposed in a position spaced apart from the frame. However, the coupling member is designed to couple the starter motor and the predetermined component. Therefore, an increase in the size of the saddle-ride type vehicle substantially reduced or prevented.

Preferably, at least a portion of the coupling member, located between the predetermined component and the starter motor, preferably is made of an elastic material. In this case, it is possible to reduce vibrations transferred from the engine to the predetermined component through the coupling member. Further, the position of the coupling member is easily shifted by deforming the portion made of the elastic material. Therefore, a tool path is easily and reliably provided.

Preferably, the coupling member is entirely made of the elastic member. In this case, it is possible to reduce vibrations transferred from the engine to the predetermined component through the coupling member. Further, the position of the coupling member is easily shifted by deforming the coupling member made of the elastic material. Therefore, a tool path is easily and reliably provided.

Preferably, the saddle-ride type vehicle further includes an engine member disposed under the predetermined component. In this case, a tool path leading to the engine member is easily and reliably provided by shifting the position of the coupling member through deformation of a portion or the entirety of the coupling member made of the elastic material.

Preferably, the coupling member includes a first hole into which the starter motor is inserted. In this case, the starter motor is easily attached to the coupling member by inserting the starter motor into the first hole.

Preferably, the coupling member includes a second hole into which the predetermined component is inserted. In this case, the predetermined component is easily attached to the coupling member by inserting the predetermined component into the second hole.

Preferably, the coupling member includes a first cylindrical portion, a second cylindrical portion, and a connecting portion. The first cylindrical portion includes a first hole into which the starter motor is inserted. The second cylindrical portion includes a second hole into which the predetermined component is inserted. The connecting portion connects the first cylindrical portion and the second cylindrical portion. In this case, the starter motor and the predetermined component are easily coupled through the coupling member by inserting the starter motor into the first hole and by inserting the predetermined component into the second hole.

Preferably, the first cylindrical portion includes an opening provided in a lateral surface of the first cylindrical portion so as to communicate with the first hole. In this case, the starter motor and the first cylindrical portion make contact with each other over a small area. In other words, the starter motor is inserted into the first hole with a small resistance. Accordingly, the attachment work of the starter motor is further easily performed. Further, the starter motor is partially exposed through the opening. Therefore, the radiation of heat from the starter motor is enhanced.

Preferably, at least one of the starter motor and the predetermined component includes a rib, which is engaged with the coupling member, on an outer surface thereof. In this case, positioning of the starter motor is performed by the rib. The starter motor is thus easily attached to the coupling member. Alternatively, positioning of the predetermined component is performed by the rib. The predetermined component is thus easily attached to the coupling member.

Preferably, the predetermined component is a canister. In this case, the canister is disposed close to the engine, a tool path is easily and reliably produced, and an increase in the weight and an increase in the number of components are substantially reduced or prevented in the saddle-ride type vehicle.

Preferably, the predetermined component is a fuel pump. In this case, the fuel pump is disposed close to the engine, a tool path is easily and reliably produced, and an increase in the weight and an increase in the number of components are substantially reduced or prevented in the saddle-ride type vehicle.

Preferably, the starter motor and the predetermined component are disposed such that axes thereof are directed in a vehicle width direction or substantially in a vehicle width direction. In this case, the starter motor and the predetermined component are compactly arranged.

Preferably, the saddle-ride type vehicle further includes a predetermined member disposed adjacent to the predetermined component. Further, the coupling member preferably includes a protruded portion that is made of an elastic material and makes contact with the predetermined member. In this case, wobbling of the predetermined component is prevented with the structure in which the protruded portion makes contact with the predetermined member.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
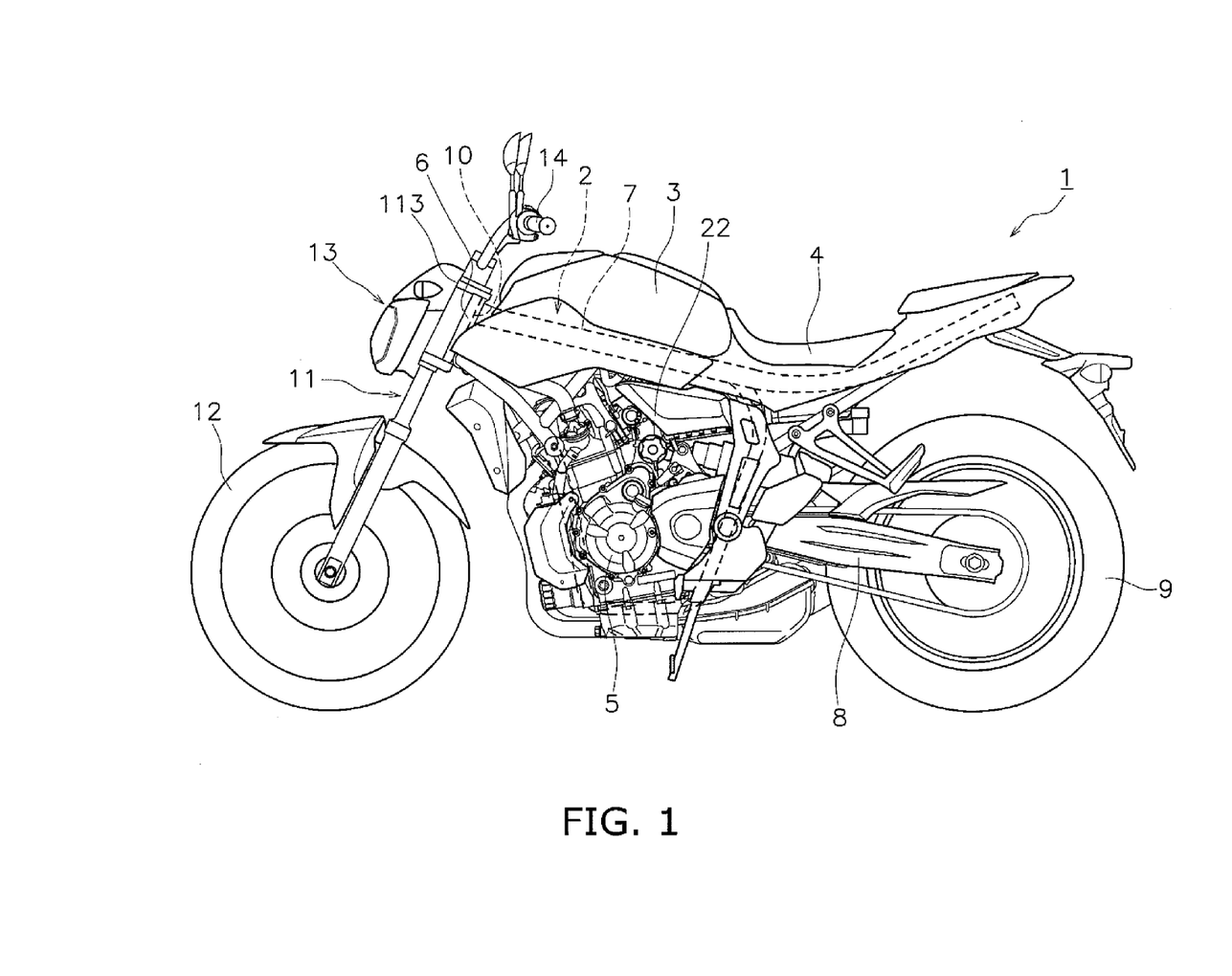
FIG. 1 is a side view of a saddle-ride type vehicle.

A saddle-ride type vehicle 1 according to preferred embodiments of the present invention will be hereinafter explained with reference to the drawings. FIG. 1 is a side view of the saddle-ride type vehicle 1. The saddle-ride type vehicle 1 is preferably a motorcycle, for example. The saddle-ride type vehicle 1 includes a frame 2, a fuel tank 3, a seat 4, and an engine 5.

The frame 2 includes a head pipe 6 and a main body frame 7. The main body frame 7 is connected to the head pipe 6 and disposed rearward of the head pipe 6.

The fuel tank 3 is disposed rearward of the head pipe 6. The fuel tank 3 is disposed over the main body frame 7. The seat 4 is disposed rearward of the fuel tank 3. The seat 4 is disposed over the main body frame 7. The engine 5 is disposed under the fuel tank 3. The engine 5 is supported by the main body frame 7. It should be noted that in the present preferred embodiment, the directional terms "front", "rear", "right" and "left" refer to directions seen from a rider seated on the seat 4.

The saddle-ride type vehicle 1 includes a rear arm 8 and a rear wheel 9. The rear arm 8 is pivotably attached to the main body frame 7. The rear wheel 9 is disposed rearward of the engine 5 and supported by the main body frame 7 through the rear arm 8.

The saddle-ride type vehicle 1 includes a steering shaft 10, a front fork 11, a front wheel 12, and a head light unit 13. The steering shaft 10 is rotatably supported by the head pipe 6 and inserted into a hole through the head pipe 6. The front fork 11 is coupled to the steering shaft 10. The front wheel 12 is rotatably supported by the lower portion of the front fork 11. Upper ends of the steering shaft 10 and the front fork 11 are coupled to a handlebar 14 through a bracket 113.

The head light unit 13 is disposed forward of the head pipe 6. The head light unit 13 is supported by the front fork 11.

Figure 2:
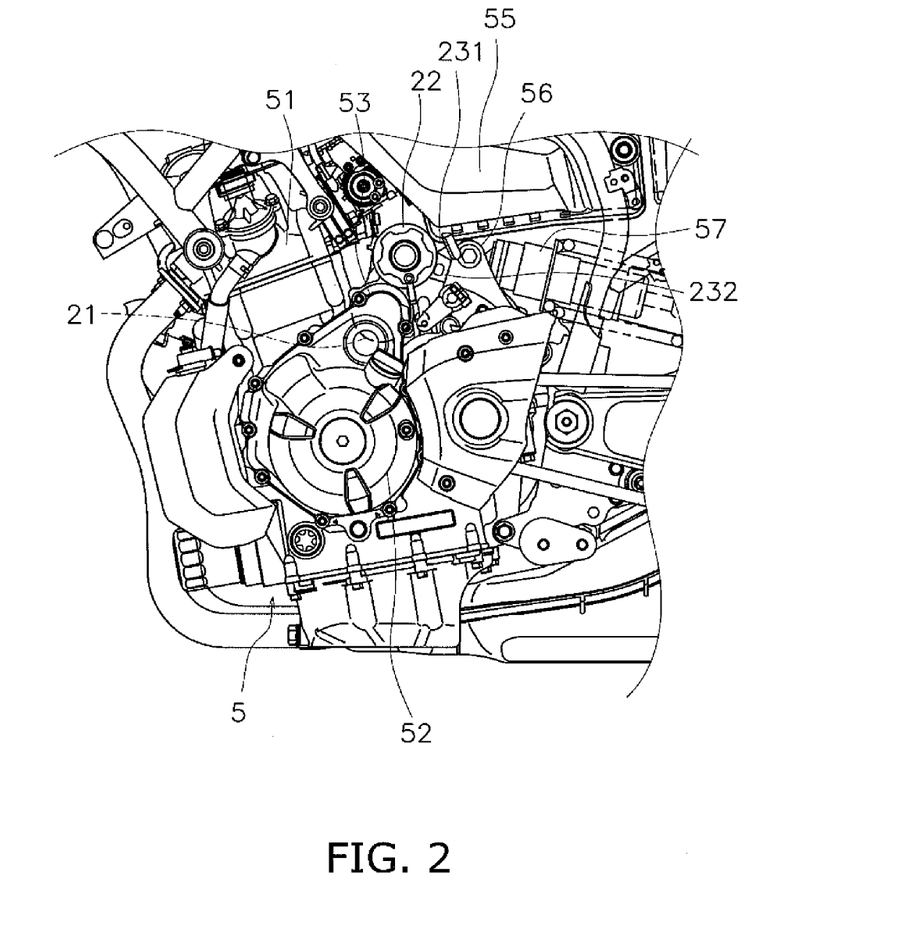
FIG. 2 is an enlarged view of a vicinity of an engine.
Figure 3:
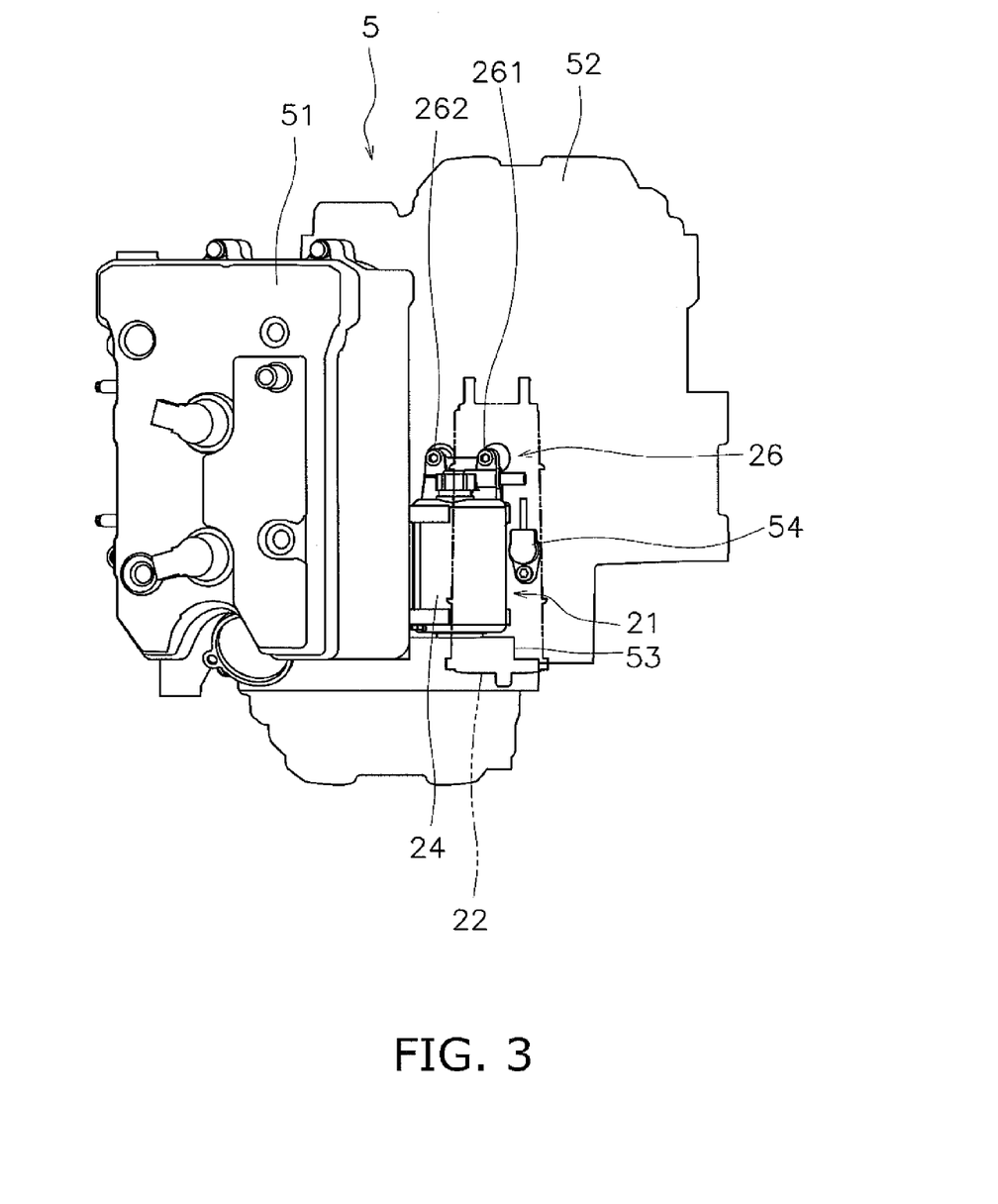
FIG. 3 is a schematic top view of the vicinity of the engine.

FIG. 2 is an enlarged view of a vicinity of the engine 5. FIG. 3 is a schematic top view of the vicinity of the engine 5. As illustrated in FIGS. 2 and 3, the saddle-ride type vehicle 1 includes a starter motor 21 and a canister 22. It should be noted that FIG. 3 depicts the position of the canister 22 with a dashed two-dotted line. The starter motor 21 and the canister 22 are coupled by a coupling member 23 to be described below. The starter motor 21 and the canister 22 are disposed such that the axes thereof are directed in a vehicle width direction or substantially in a vehicle width direction.

The starter motor 21 is attached to the engine 5. The engine 5 includes a cylinder 51 and a crankcase 52. The cylinder 51 extends from the crankcase 52 in a direction intersecting with a horizontal direction. In the present preferred embodiment, the cylinder extends forward and obliquely upward from the crankcase 52. The crankcase 52 includes a motor mount portion 53. The motor mount portion 53 is located rearward of the cylinder 51. The motor mount portion 53 protrudes upwardly from a lateral portion of the top surface of the crankcase 52. The starter motor 21 is mounted to the motor mount portion 53.

In detail, as illustrated in FIG. 3, the starter motor 21 includes a motor main body portion 24, a rotary shaft 25 (see FIG. 4), and a bracket portion 26. The motor main body portion 24 has a cylindrical or substantially cylindrical shape. The rotary shaft 25 protrudes from one end surface of the motor main body portion 24 in the axial direction of the motor main body portion 24. The rotary shaft 25 of the starter motor 21 is inserted into the motor mount portion 53 and meshes with a gear disposed within the motor mount portion 53.

The bracket portion 26 attaches the starter motor 21 to the crankcase 52. The bracket portion 26 includes a first bracket portion 261 and a second bracket portion 262. The first and second bracket portions 261 and 262 respectively protrude from the other end surface of the motor main body portion 24 in the axial direction of the motor main body portion 24. The first and second bracket portions 261 and 262 are fixed to the crankcase 52 by fixation members such as bolts.

The canister 22 is disposed adjacent to the starter motor 21. As illustrated in FIG. 2, the canister 22 is located obliquely upward of the starter motor 21. The canister 22 is disposed rearward of the cylinder 51. As illustrated in FIG. 3, the canister 22 partially overlaps with the starter motor 21 in a plan view. In more detail, the front portion of the canister 22 overlaps with the rear portion of the starter motor 21. Further, a sensor 54 is disposed under the canister 22. The sensor 54 is configured to detect the rotation speed of the engine 5. In the plan view, the sensor 54 overlaps with the rear portion of the canister 22. As illustrated in FIG. 1, the canister 22 does not overlap with the frame 2 in a vehicle side view.

Figure 4:
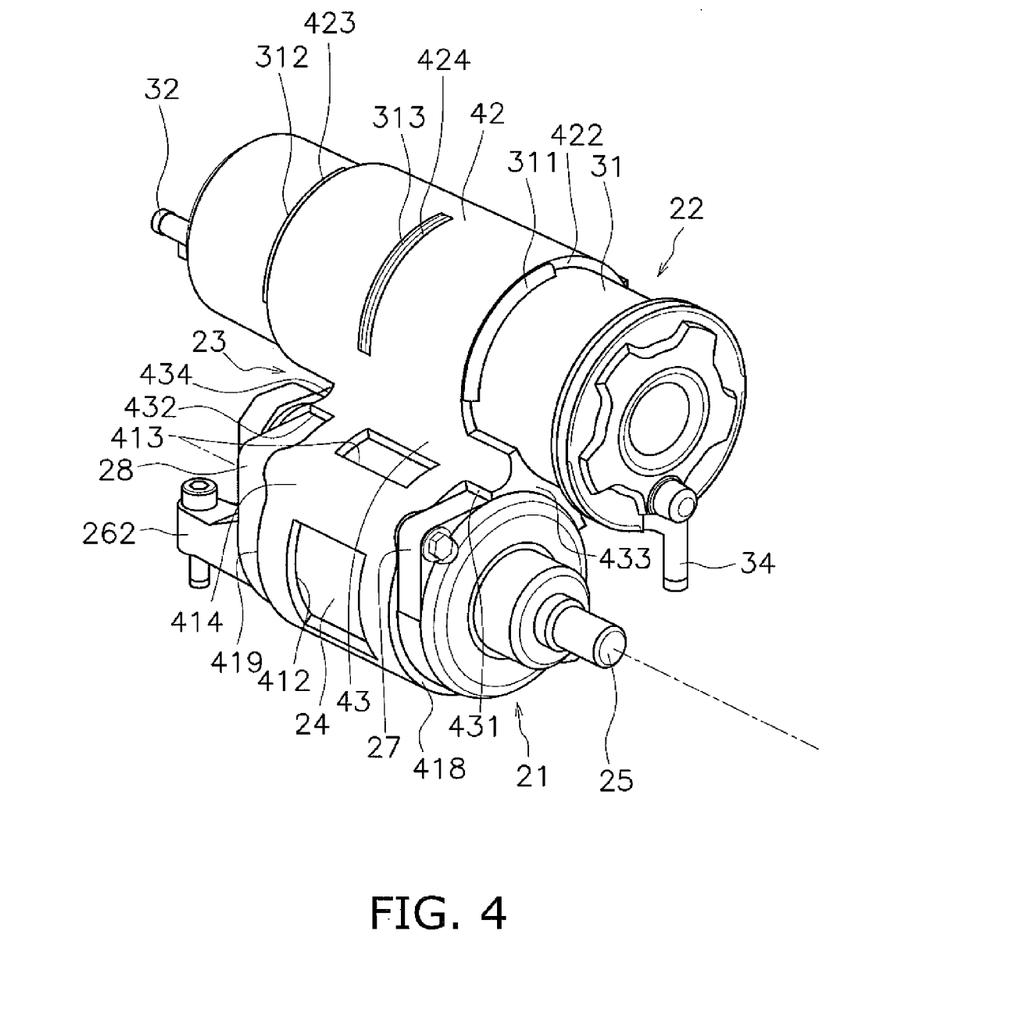
FIG. 4 is a perspective view of a starter motor, a canister, and a coupling member.
Figure 5:
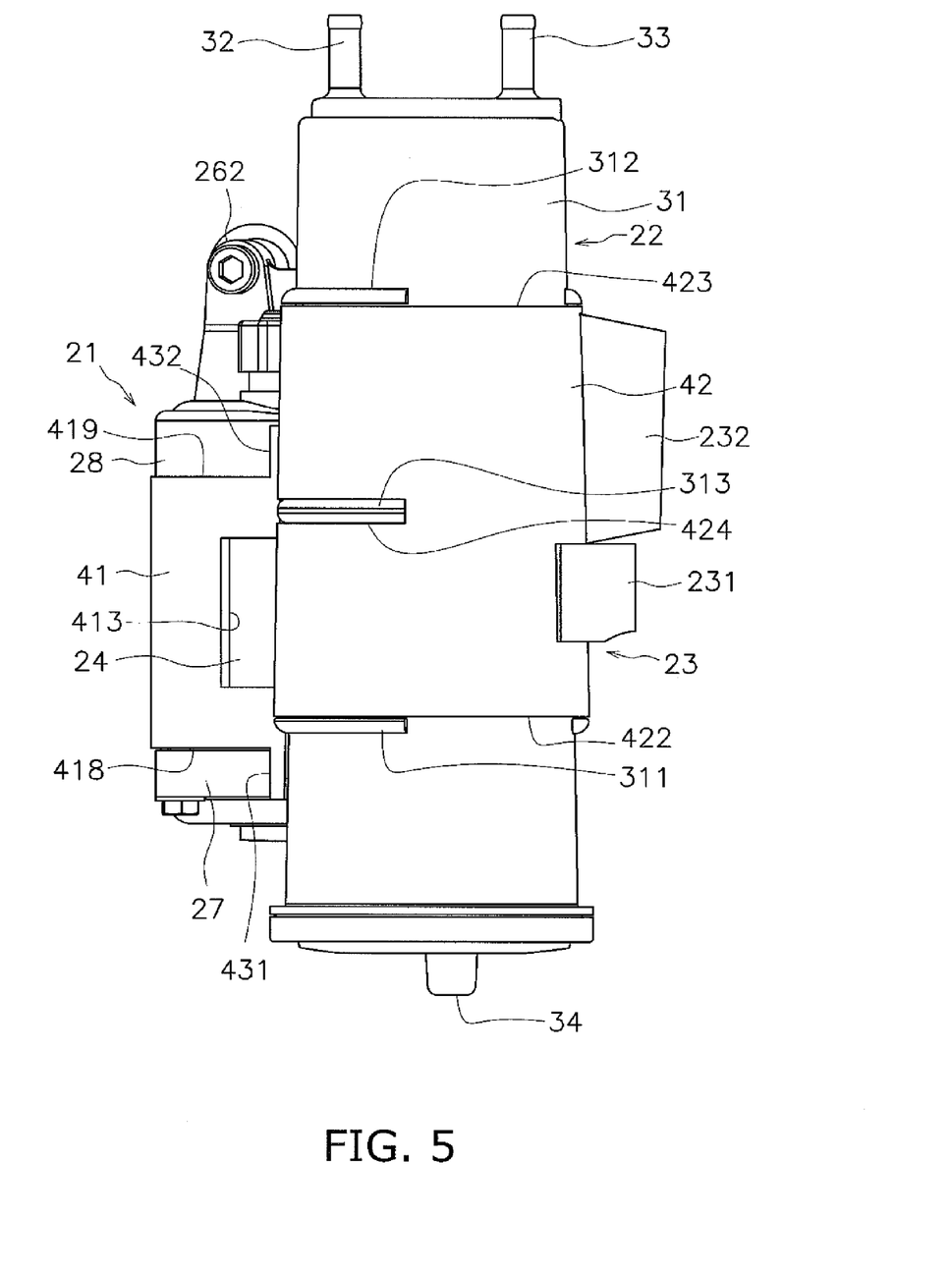
FIG. 5 is a top view of the starter motor, the canister, and the coupling member.

FIG. 4 is a perspective view of the starter motor 21, the canister 22, and the coupling member 23. FIG. 5 is a plan view of the starter motor 21, the canister 22, and the coupling member 23.

The canister 22 includes a canister main body portion 31, a first connection port 32, a second connection port 33, and an air discharge port 34. The canister main body portion 31 has a cylindrical or substantially cylindrical shape. The first and second connection ports 32 and 33 protrudes from one end surface of the canister main body portion 31. The first and second connection ports 32 and 33 extend in the axial direction of the canister main body portion 31. A hose from a throttle body of the engine 5 is connected to the first connection port 32. A hose from the fuel tank 3 is connected to the second connection port 33. The air discharge port 34 protrudes from the other end surface of the canister main body portion 31. The air discharge port 34 extends in the axial direction of the canister main body portion 31 and then bends downwardly.

Figure 6:
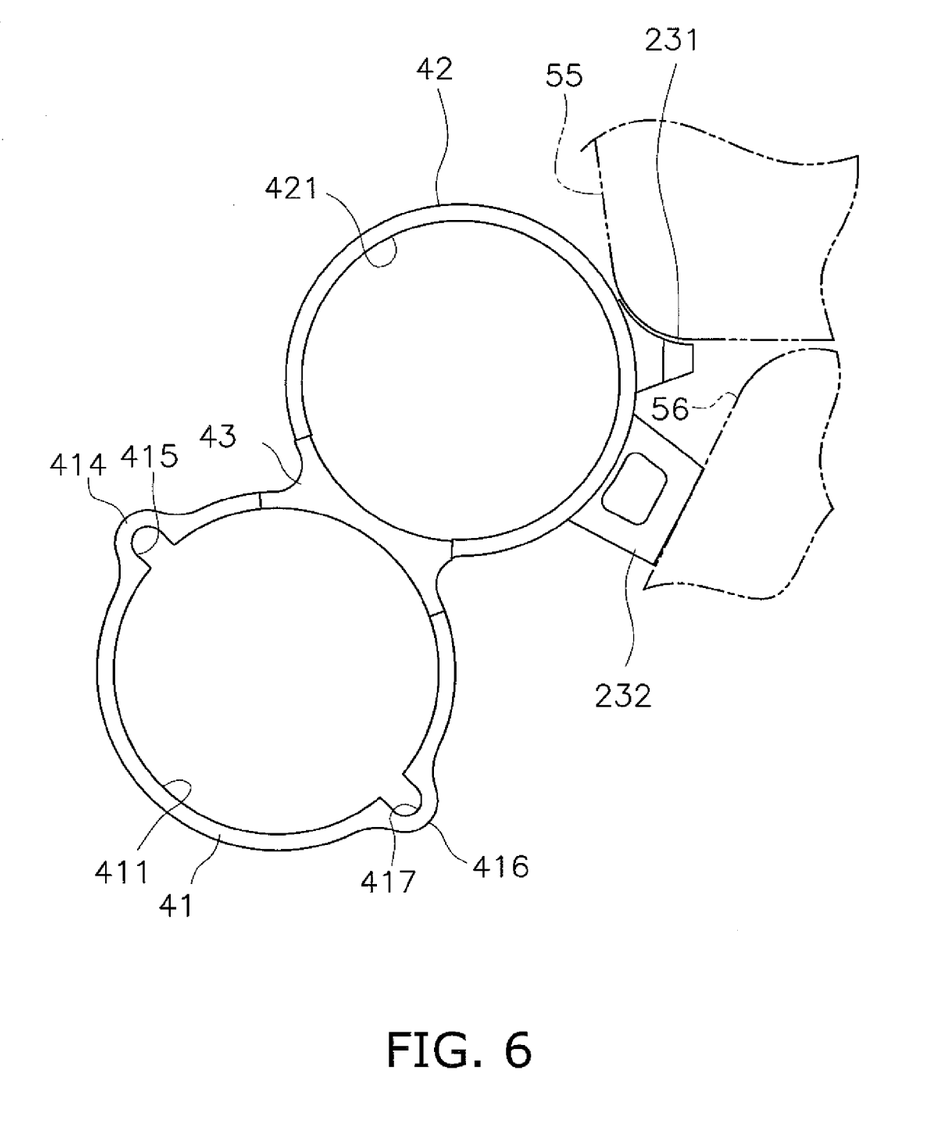
FIG. 6 is a side view of the coupling member.

The coupling member 23 couples the canister 22 to the starter motor 21. FIG. 6 is a side view of the coupling member 23. As illustrated in FIG. 6, the coupling member 23 includes a first cylindrical portion 41, a second cylindrical portion 42, and a connecting portion 43. The first cylindrical portion 41 includes a first hole 411. The starter motor 21 is inserted into the first hole 411. The second cylindrical portion 42 includes a second hole 421. The canister 22 is inserted into the second hole 421. The axis of the first cylindrical portion 41 and the axis of the second cylindrical portion 42 are arranged parallel or substantially parallel to each other.

The connecting portion 43 connects the first cylindrical portion 41 and the second cylindrical portion 42. The first cylindrical portion 41, the second cylindrical portion 42, and the connecting portion 43 are all preferably made of an elastic material. The coupling member 23 is preferably entirely made of the elastic material.

As illustrated in FIG. 4, the first cylindrical portion 41 includes openings 412 and 413 in the lateral surface thereof. The openings 412 and 413 communicate with the first hole 411. Therefore, the lateral surface of the motor main body portion 24 is partially exposed through the openings 412 and 413, while the starter motor 21 is inserted into the first hole 411. The first cylindrical portion 41 includes a first attachment portion 414. The first attachment portion 414 protrudes from the outer peripheral surface of the first cylindrical portion 41 and extends in the axial direction of the first cylindrical portion 41. As illustrated in FIG. 6, the first attachment portion 414 includes a first groove portion 415 provided on the inner peripheral surface thereof. The first groove portion 415 communicates with the first hole 411. The first groove portion 415 extends in the axial direction of the first cylindrical portion 41.

As illustrated in FIG. 4, the starter motor 21 includes a first fixation portion 27 and a second fixation portion 28. The first and second fixation portions 27 and 28 protrude from the circumferential surface of the motor main body portion 24. The first and second fixation portions 27 and 28 are spaced apart from each other in the axial direction of the motor main body portion 24.

The first attachment portion 414 of the coupling member 23 is located between the first fixation portion 27 and the second fixation portion 28. Further, a fixation member such as a bolt is inserted through a hole in the first fixation portion 27, the first groove portion 415, and a hole in the second fixation portion 28. The starter motor 21 is thus fixed to the coupling member 23.

It should be noted that, although not illustrated in the drawings, the starter motor 21 further includes a third fixation portion and a fourth fixation portion. The third and fourth fixation portions are disposed similarly to the first and second fixation portions 27 and 28. The third and fourth fixation portions are disposed on the outer peripheral surface of the motor main body portion 24 and located on the opposite side of the first and second fixation portions 27 and 28. As illustrated in FIG. 6, the first cylindrical portion 41 includes a second attachment portion 416 and a second groove portion 417. The second attachment portion 416 protrudes from the outer peripheral surface of the first cylindrical portion 41. The second groove portion 417 is provided on the inner peripheral surface of the second attachment portion 416. The second attachment portion 416 is disposed between the third fixation portion and the fourth fixation portion. Further, a fixation member such as a bolt is inserted through a hole in the third fixation portion, the second groove portion 417, and a hole in the fourth fixation portion. The starter motor 21 is thus fixed to the coupling member 23.

A first rib 311, a second rib 312, and a third rib 313 are mounted to the outer peripheral surface of the canister main body portion 31. The first, second, and third ribs 311, 312, and 313 respectively protrude from the outer peripheral surface of the canister main body portion 31 and extend along the circumferential direction of the canister main body portion 31. The first, second, and third ribs 311, 312, and 313 are spaced apart from each other in the axial direction of the canister main body portion 31. The third rib 313 is located between the first rib 311 and the second rib 312 in the axial direction of the canister main body portion 31.

The second cylindrical portion 42 includes a first end portion 422 and a second end portion 423. The first rib 311 is engaged with the first end portion 422. The second rib 312 is engaged with the second end portion 423. The canister 22 is thus retained by the first rib 311 and the second rib 312 so as not to detach in the axial direction from the second cylindrical portion 42.

The second cylindrical portion 42 includes a slit 424 in the circumferential surface thereof. The slit 424 penetrates through the circumferential surface of the second cylindrical portion 42 and thus communicates with the second hole 421. The third rib 313 is engaged with the slit 424. With the structure of the third rib 313 being engaged with the slit 424, the canister 22 is prevented from rotating with respect to the second cylindrical portion 42.

As illustrated in FIGS. 5 and 6, the coupling member 23 includes a first protruded portion 231 and a second protruded portion 232. The first and second protruded portions 231 and 232 are preferably made of an elastic material. The first and second protruded portions 231 and 232 protrude from the outer peripheral surface of the second cylindrical portion 42. As illustrated in FIG. 2, an air cleaner 55 is disposed over the canister 22 and adjacent to the canister 22. The first protruded portion 231 is disposed to oppose the air cleaner 55. The first protruded portion 231 makes contact with the air cleaner 55.

As illustrated in FIG. 2, a link portion 56 is disposed rearward of the canister 22 and adjacent to the canister 22. The link portion 56 is a portion configured to connect a rear suspension 57 and the engine 5. The link portion 56 is connected to the crankcase 52. The second protruded portion 232 is disposed to oppose the link portion 56. The second protruded portion 232 makes contact with the link portion 56.

As illustrated in FIGS. 4 and 5, in the axial direction of the cylindrical portion 41, the length of the connecting portion 43 is greater than that of the first cylindrical portion 41. The connecting portion 43 includes a first step portion 431 and a second step portion 432. The first and second step portions 431 and 432 respectively protrude from the both ends of the first cylindrical portion 41 in opposite axial directions. The first cylindrical portion 41 includes a first end portion 418 and a second end portion 419. The connecting portion 43 includes a first end portion 433 and a second end portion 434. The first step portion 431 is located between the first end portion 418 of the first cylindrical portion 41 and the first end portion 433 of the connecting portion 43. The second step portion 432 is located between the second end portion 419 of the first cylindrical portion 41 and the second end portion 434 of the connecting portion 43.

The first end portion 422 of the second cylindrical portion 42 is located in a position recessed from the position of the first end portion 433 of the connecting portion 43 in the axial direction of the second cylindrical portion 42. In other words, the first end portion 433 of the connecting portion 43 axially protrudes in comparison with the first end portion 422 of the second cylindrical portion 42. The second end portion 423 of the second cylindrical portion 42 is located in a position protruding from the position of the second end portion 434 of the connecting portion 43 in the axial direction of the second cylindrical portion 42. In other words, the second end portion 434 of the connecting portion 43 is located in a position axially recessed from the second end portion 423 of the second cylindrical portion 42. Thus, the connecting portion 43 supports the canister 22 with the first and second step portions 431 and 432 as well as the portion extending to the first cylindrical portion 41. Therefore, wobbling of the canister 22, as if it were shaken along its axis, is prevented. It should be noted that the effect of preventing wobble is also achieved with only one of the first and second step portions 431 and 432.

Further, it is possible to flexibly adapt to and accommodate any difference in an axial length between the starter motor 21 and the canister 22 and the layout of the starter motor 21 and the canister 22 by disposing the first and second cylindrical portions 41 and 42 such that the axial positions thereof are shifted from each other.

The saddle-ride type vehicle of the present preferred embodiment preferably includes the following features.

The canister 22 is coupled to the starter motor 21 through the coupling member 23. Therefore, the canister 22 is disposed close to the engine 5. Further, the coupling member 23 is designed to couple the starter motor 21 and the canister 22, both of which are disposed close to the engine 5. Therefore, in comparison with the structure in which a stay is mounted between the canister 22 and the frame 2, the coupling member 23 is prevented from extending into the space surrounding the engine 5. Thus, a tool path is easily and reliably provided.

Especially in the present preferred embodiment, the canister 22 is located so as not to overlap with the frame 2 in a vehicle side view. Therefore, a long distance is provided between the frame 2 and the canister 22. Due to this configuration, when a stay is designed to be mounted between the canister 22 and the frame 2, the stay is required to have a large size. However, the coupling member 23 of the present preferred embodiment is designed to couple the starter motor 21 and the canister 22. Hence, the coupling member 23 has a smaller size than the stay. Further, the coupling member 23 is preferably made of an integral elastic material. Therefore, an increase in the weight and an increase in the number of components are substantially reduced or prevented in the saddle-ride type vehicle 1.

The canister 22 is disposed rearward of the cylinder 51. Hence, the space rearward of the cylinder 51 is effectively utilized as the installation space of the canister 22.

The coupling member 23 is preferably entirely made of an elastic material. Hence, it is possible to reduce or prevent vibrations transferred from the engine 5 to the canister 22 through the coupling member 23. Further, the coupling member 23 is easily deformed because the coupling member 23 is preferably made of an elastic material. Therefore, the position of the coupling member 23 is easily shifted by deforming the coupling member 23. For example, a tool path leading to the sensor 54 is easily and reliably produced by shifting the position of the canister 22 through deformation of the coupling member 23.

When being inserted into the first hole 411 of the first cylindrical portion 41, the starter motor 21 is attached to the coupling member 23. On the other hand, when being inserted into the second hole 421 of the second cylindrical portion 42, the canister 22 is attached to the coupling member 23. Thus, the starter motor 21 and the canister 22 are easily coupled through the coupling member 23. Further, the coupling member 23 has a simple structure. Therefore, in comparison with a structure using the stay, an increase in the weight and an increase in the number of components are substantially reduced or prevented in the saddle-ride type vehicle 1.

The first cylindrical portion 41 includes the openings 412 and 413 that are provided in the lateral surface thereof so as to communicate with the first hole 411. Therefore, the motor main body portion 24 and the first cylindrical portion 41 make contact with each other over a small area. In other words, the starter motor 21 is inserted into the first hole 411 with a small resistance. Accordingly, the attachment work of the starter motor 21 is further easily performed. Further, the motor main body portion 24 is partially exposed through the openings 412 and 413. Therefore, the radiation of heat from the starter motor 21 is enhanced.

The first and second ribs 311 and 312 to be engaged with the coupling member 23 are disposed on the outer peripheral surface of the canister 22. Thus, positioning of the canister 22 is performed by the first and second ribs 311 and 312. The canister 22 is thus easily attached to the coupling member 23.

The starter motor 21 and the canister 22 are disposed such that the axes thereof are directed in the vehicle width direction or substantially in the vehicle width direction. Therefore, the starter motor 21 and the canister 22 are compactly arranged.

The first protruded portion 231 of the coupling member 23 makes contact with the air cleaner 55. On the other hand, the second protruded portion 232 of the coupling member 23 makes contact with the link portion 56. Accordingly, wobbling of the canister 22 is prevented.

Preferred embodiments of the present invention have been explained above. However, the present invention is not limited to the aforementioned preferred embodiments, and a variety of changes can be made without departing from the scope of the present invention.

The saddle-ride type vehicle of the present invention is not limited to the motorcycle, and may be a vehicle equipped with three or more wheels, an all-terrain vehicle, or a snow mobile. Further, the motorcycle according to a preferred embodiment of the present invention is not limited to a sport motorcycle as described in the aforementioned preferred embodiments, and alternatively, may be a motorcycle of any other type such as a scooter or a moped.

The predetermined component may be a fuel pump. Specifically in the aforementioned preferred embodiments, instead of the canister 22, the fuel pump may be coupled to the starter motor 21 through the coupling member 23.

The coupling member 23 may be only partially made of an elastic material. For example, the connecting portion 43 may be made of an elastic material, whereas the first and second cylindrical portions 41 and 42 may be made of a material other than an elastic material, for instance, a resin or a metal.

The position of the canister 22 is not limited to the position rearward of the cylinder 51, and alternatively, may be any other suitable position around the engine 5. The extending direction of the cylinder 51 is not limited to the direction intersecting with the horizontal direction, and alternatively, may be the horizontal direction. The canister 22 may be located so as to overlap with the frame 2 in a vehicle side view. The position of the sensor 54 is not limited to the position under the canister 22, and alternatively, may be any other suitable position. Further, preferred embodiments of the present invention are effective not only for reliably producing a tool path leading to a sensor but also for reliably producing a tool path leading to a fastening bolt of the engine case, a sheet metal fixed to the engine case, or so forth.

The shape of the coupling member 23 is not limited to that described above. For example, the starter motor 21 may be attached to the coupling member 23 by a structure different from the first cylindrical portion 41. Alternatively, the canister 22 may be attached to the coupling member 23 by a structure different from the second cylindrical portion 42.

In the aforementioned preferred embodiments, the starter motor 21 and the canister 22 are preferably disposed such that the axes thereof are directed in the vehicle width direction or substantially in the vehicle width direction. However, the starter motor 21 and the canister 22 may be disposed such that the axes thereof are arranged in a direction intersecting with the vehicle width direction. For example, the starter motor 21 and the canister 22 may be disposed such that the axes thereof are directed in the back-and-forth direction. Alternatively, the starter motor 21 and the canister 22 may be disposed such that the axes thereof are directed in a direction slanted with respect to the vehicle width direction.

The component with which the first protruded portion 231 of the coupling member 23 makes contact is not limited to the air cleaner 55, and may be any other suitable component. Alternatively, the component with which the second protruded portion 232 makes contact is not limited to the link portion 56, and may be any other suitable component.

The shape of the canister 22 is not limited to a cylindrical or substantially cylindrical shape, and may be any other suitable shape such as a cubic shape. Likewise, the shape of the starter motor 21 is not limited to a cylindrical or substantially cylindrical shape, and may be any other suitable shape such as a cubic shape.

The starter motor 21 may be provided with ribs. Alternatively, the starter motor 21 and the canister 22 may be respectively provided with ribs.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A saddle-ride type vehicle comprising:
   a frame;
   an engine supported by the frame;
   a starter motor attached to the engine;
   a predetermined component; and
   a coupling member coupling the predetermined component to the starter motor; wherein
   the coupling member includes a hole, and the predetermined component is inserted into the hole such that the predetermined component is engaged with the coupling member; and
   the predetermined component is a canister or a fuel pump.

2. The saddle-ride type vehicle according to claim 1, wherein the engine includes a cylinder extending in a direction intersecting with a horizontal direction, and the predetermined component is disposed rearward of the cylinder.

3. The saddle-ride type vehicle according to claim 1, wherein the predetermined component does not overlap with the frame in a vehicle side view.

4. The saddle-ride type vehicle according to claim 1, wherein at least a portion of the coupling member is made of an elastic material, and the portion is located between the predetermined component and the starter motor.

5. The saddle-ride type vehicle according to claim 4, wherein the coupling member is entirely made of the elastic material.

6. The saddle-ride type vehicle according to claim 4, further comprising an engine member disposed under the predetermined component.

7. The saddle-ride type vehicle according to claim 1, wherein the coupling member includes a hole into which the starter motor is inserted.

8. The saddle-ride type vehicle according to claim 1, wherein the coupling member includes:
   a first cylindrical portion including a first hole into which the starter motor is inserted;
   a second cylindrical portion including a second hole into which the predetermined component is inserted; and a connecting portion directly connecting the first cylindrical portion and the second cylindrical portion.

9. The saddle-ride type vehicle according to claim 8, wherein the first cylindrical portion includes an opening, the opening is provided in a lateral surface of the first cylindrical portion so as to communicate with the first hole.

10. The saddle-ride type vehicle according to claim 7, wherein at least one of the starter motor and the predetermined component includes a rib on an outer surface thereof, and the rib is engaged with an opening or an end portion of the coupling member.

11. The saddle-ride type vehicle according to claim 1, wherein the starter motor and the predetermined component are disposed such that an axis of the starter motor and an axis of the predetermined component are directed in a vehicle width direction.

12. The saddle-ride type vehicle according to claim 1, further comprising:
   a predetermined member; wherein
      the coupling member includes a protruded portion made of an elastic material, and the protruded portion contacts the predetermined member.

13. The saddle-ride type vehicle according to claim 1, wherein the coupling member directly couples the predetermined component to the starter motor.

14. The saddle-ride type vehicle according to claim 1, wherein the coupling member is a single, integral element.

* * * * *